US012421040B2

(12) United States Patent
Korge-Hårajuvet et al.

(10) Patent No.: US 12,421,040 B2
(45) Date of Patent: Sep. 23, 2025

(54) METHOD AND CONTROL SYSTEM FOR PREPARING ORDERS OF GOODS STORED IN AN AUTOMATED STORAGE SYSTEM

(71) Applicant: Autostore Technology AS, Nedre Vats (NO)

(72) Inventors: Geir Korge-Hårajuvet, Vikedal (NO); Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 802 days.

(21) Appl. No.: 17/595,619

(22) PCT Filed: May 5, 2020

(86) PCT No.: PCT/EP2020/062406
§ 371 (c)(1),
(2) Date: Nov. 19, 2021

(87) PCT Pub. No.: WO2020/233978
PCT Pub. Date: Nov. 26, 2020

(65) Prior Publication Data
US 2022/0227582 A1   Jul. 21, 2022

(30) Foreign Application Priority Data
May 20, 2019   (NO) .................................... 20190629

(51) Int. Cl.
*B65G 1/137*   (2006.01)
*B65G 1/04*   (2006.01)
(Continued)

(52) U.S. Cl.
CPC ......... *B65G 1/1373* (2013.01); *B65G 1/0464* (2013.01); *B65G 1/1371* (2013.01);
(Continued)

(58) Field of Classification Search
CPC .. B65G 1/1373; B65G 1/0464; B65G 1/1371; B65G 2203/046; G06Q 10/04;
(Continued)

(56) References Cited

U.S. PATENT DOCUMENTS 207,886 A * 9/1878 Bloom ...................... F02M 5/12
261/70
10,997,645 B1 * 5/2021 Philbin ................... G01S 19/52
(Continued)

FOREIGN PATENT DOCUMENTS

CN   105858045 A   8/2016
CN   106600195 A   4/2017
(Continued)

OTHER PUBLICATIONS

International Search Report issued in PCT/EP2020/062406 on Jun. 23, 2020 (4 pages).
(Continued)

*Primary Examiner* — Jacob S. Scott
*Assistant Examiner* — Erin Morris
(74) *Attorney, Agent, or Firm* — Baker Botts L.L.P.

(57) ABSTRACT

A control system controls an automated storage and retrieval system to perform a method including receiving a plurality of orders in an order list; allocating each order to one of a plurality of pick-up entities; ranking the plurality of orders in the order list according to time received; estimating, for each order, a preparation time for preparing and delivering the order to a pick-up point for pick-up by the allocated pick-up entity; estimating, for each order, a pick-up time at which the allocated pick-up entity will be ready to pick up the order based on information about the allocated pick-up entity; comparing, for each order, the estimated preparation time and the estimated pick-up time; updating the ranking of the orders in the order list so that each order will be delivered
(Continued)

at the pick-up point at a time within a predetermined time interval overlapping the estimated pick-up time of the allocated pick-up entity; and controlling the automated storage and retrieval system for preparing and delivering the orders of goods at the pick-up point according to the updated ranking of orders in the order list.

13 Claims, 4 Drawing Sheets

(51) Int. Cl.
*G06Q 10/04* (2023.01)
*G06Q 10/087* (2023.01)

(52) U.S. Cl.
CPC ............ *G06Q 10/04* (2013.01); *G06Q 10/087* (2013.01); *B65G 2203/046* (2013.01)

(58) Field of Classification Search
CPC .. G06Q 10/087; G06Q 10/08; G06Q 10/0834; G06K 19/0723; G06N 20/00
See application file for complete search history.

(56) References Cited

U.S. PATENT DOCUMENTS

| | | | | |
|---|---|---|---|---|
| 2002/0178074 | A1* | 11/2002 | Bloom | ................... G06Q 20/00 705/26.81 |
| 2010/0010902 | A1* | 1/2010 | Casey | ................. G06Q 30/0601 705/26.1 |
| 2013/0030955 | A1 | 1/2013 | David | |
| 2014/0102859 | A1 | 4/2014 | Aby-Eva | |
| 2014/0350950 | A1 | 11/2014 | Jaskela et al. | |
| 2018/0043528 | A1* | 2/2018 | Lindbo | ................... B65G 1/065 |
| 2018/0346247 | A1 | 12/2018 | DeWitt et al. | |
| 2020/0071076 | A1* | 3/2020 | Fosnight | .............. G05D 1/0276 |
| 2020/0283229 | A1* | 9/2020 | Edwards | .............. G05D 1/0297 |

FOREIGN PATENT DOCUMENTS

| | | | |
|---|---|---|---|
| CN | 109345161 A | 2/2019 | |
| ES | 2996586 T3 * | 2/2025 | ............... B65G 1/02 |
| JP | H04327428 A | 11/1992 | |
| JP | H05233653 A | 9/1993 | |
| JP | H0748007 A | 2/1995 | |
| JP | 2002321829 A | 11/2002 | |
| JP | 2019059624 A | 4/2019 | |
| NO | 317366 B1 | 10/2004 | |
| WO | 2014/090684 A1 | 6/2014 | |
| WO | 2018/162757 A1 | 9/2018 | |
| WO | WO-2021038437 A1 * | 3/2021 | ........... B65G 1/0464 |
| WO | WO-2022133353 A1 * | 6/2022 | ............. G06Q 20/18 |

OTHER PUBLICATIONS

Written Opinion of the International Searching Authority issued PCT/EP2020/062406 on Jun. 23, 2020 (12 pages).
International Preliminary Report on Patentability from PCT/EP2020/062406 mailed on Sep. 1, 2021 (17 pages).
Norwegian Search Report issued in No. 20190629 mailed on Dec. 23, 2019 (2 pages).
China National Intellectual Property Administration, Office Action for Chinese Patent Application No. 202080048795.7 mailed Jun. 28, 2024, 10 pages (including translation).
China National Intellectual Property Administration, Search Report for Chinese Patent Application No. 202080048795.7 mailed Jun. 26, 2024, 4 pages (including translation).
Mari Uchida, Notice of Reasons for Rejection for Japanese Patent Application No. 2021-568890, mailed Jul. 1, 2024, 16 pages (including translation), Japan Patent Office, Tokyo, Japan.
Anonymous, "Request of Submission of Opinion" for Korean Patent Application No. KR10-2021-7041105, dated Feb. 10, 2025, 9 pages, pub. by KIPO, Seo-gu, Daejeon, Korea.
Dong Ziyi, Notification of the Second Office Action for Chinese Patent Application No. 202080048795.7 mailed Mar. 27, 2025, 9 pages (including translation), State Intellectual Property Office of PRC, Beijing, China.
Dong Ziyi, Decision of Rejection for Chinese Patent Application No. 202080048795.7 mailed May 28, 2025, 13 pages, State Intellectual Property Office of PRC, Beijing, China.
Moltenbrey, Michael, Office Action in EP20729949.6, mailed Jul. 31, 2025, 7 pages, European Patent Office, Munich, Germany.

\* cited by examiner

| Order no. | Time received (time stamp) | Time to prepare (min:sec) | Priority | Pick-up entity |
|---|---|---|---|---|
| # 01 | 11:15 AM | 09:11 | Normal | A |
| # 02 | 11:16 AM | 04:21 | Low | A |
| # 03 | 11:20 AM | 07:11 | Normal | C |
| # 04 | 11:21 AM | 11:11 | Normal | B |
| # 05 | 11:23 AM | 14:45 | High | B |
| # 06 | 11:33 AM | 09:29 | Low | C |
| # 07 | 11:45 AM | 04:33 | Normal | A |
| # 08 | 11:57 AM | 03:19 | Normal | C |
| # 09 | 12:05 PM | 09:16 | High | B |
| # 10 | 12:09 PM | 08:05 | Normal | B |

Fig. 4A

| Order no. | Time received (time stamp) | Time to prepare (min:sec) | Priority | Pick-up entity |
|---|---|---|---|---|
| # 01 | 11:15 AM | 09:11 | Normal | A |
| # 07 | 11:45 AM | 04:33 | Normal | A |
| # 02 | 11:16 AM | 04:21 | Low | A |
| # 05 | 11:23 AM | 14:45 | High | B |
| # 09 | 12:05 PM | 09:16 | High | B |
| # 04 | 11:21 AM | 11:11 | Normal | B |
| # 10 | 12:09 PM | 08:05 | Normal | B |
| # 03 | 11:20 AM | 07:11 | Normal | C |
| # 08 | 11:57 AM | 03:19 | Normal | C |
| # 06 | 11:33 PM | 09:29 | Low | C |

Fig. 4B

| Preparing sequence | Order no. | Start time for preparing | Pick-up entity | Est. pick-up time |
|---|---|---|---|---|
| 01 | # 06 | 1:00:31 PM | C | 1:15:00 PM |
| 02 | # 03 | 1:02:49 PM | C | 1:15:00 PM |
| 03 | # 08 | 1:06:41 PM | C | 1:15:00 PM |
| 04 | # 05 | 1:15:15: PM | B | 1:35:00 PM |
| 05 | # 04 | 1:18:49 PM | B | 1:35:00 PM |
| 06 | # 09 | 1:20:44 PM | B | 1:35:00 PM |
| 07 | # 10 | 1:21:55 PM | B | 1:35:00 PM |
| 08 | # 01 | 1:50:49 PM | A | 2:05:00 PM |
| 09 | # 07 | 1:55:27 PM | A | 2:05:00 PM |
| 10 | # 02 | 1:55:39 PM | A | 2:05:00 PM |

Fig. 4C

| Preparing sequence | Order no. | Start time for preparing (10s intervals) | Priority | Pick-up entity | Est. pick-up time |
|---|---|---|---|---|---|
| 01 | # 03 | 1:02:49 PM | Normal | C | 1:05:00 PM |
| 02 | # 08 | 1:06:31 PM | Normal | C | 1:05:00 PM |
| 03 | # 06 | 1:00:11 PM | Low | C | 1:05:00 PM |
| 04 | # 05 | 1:15:15: PM | High | B | 1:25:00 PM |
| 05 | # 09 | 1:20:34 PM | High | B | 1:25:00 PM |
| 06 | # 04 | 1:18:29 PM | Normal | B | 1:25:00 PM |
| 07 | # 10 | 1:21:25 PM | Normal | B | 1:25:00 PM |
| 08 | # 01 | 1:50:49 PM | Normal | A | 1:55:00 PM |
| 09 | # 07 | 1:55:17 PM | Normal | A | 1:55:00 PM |
| 10 | # 02 | 1:55:19 PM | Low | A | 1:55:00 PM |

Fig. 4D

METHOD AND CONTROL SYSTEM FOR PREPARING ORDERS OF GOODS STORED IN AN AUTOMATED STORAGE SYSTEM

INTRODUCTION

The present invention relates to a method, control system and computer program for preparing orders of goods stored in storage containers in an automated storage and retrieval system. Ordered goods are prepared and delivered to a pick-up point when the ordered goods can be picked up. This optimizes the use of storage capabilities of the automated storage and retrieval system and minimizes the need for temporal storage space at a pick-up point.

BACKGROUND

There are different kinds of storage and retrieval system where goods are stored until they are retrieved and transferred to another location. In an automated storage system, goods of same type are typically stored in the same storage container or bin.

An order typically specifies different kinds of goods. When orders comprising different kinds of goods are received, goods from different storage containers are picked and collected. Picking of goods according to an order may be automated and performed by robots or performed manually by people. Ordered goods are normally prepared from a storage and retrieval system as soon as an order is received.

Robots having access to the storage and retrieval system may for instance pick ordered goods from different bins and place them in one or more bins for further handling, e.g. controlling that the picked goods correspond to the order, packing the goods in boxes, applying address labels etc.

Today, storage and retrieval systems are typically operated by a combination of people and co-operating robots. Goods from an automated storage system may also be made accessible at a picking station where picking from bins holding different types of goods is performed, as the bins storing goods according to an order pass through the picking station. When goods are picked and prepared for shipping, they are transported to a pick-up point, which is a location where goods are transferred to for being picked up by a pick-up entity, e.g. a vehicle, and transported to a destination.

Transportation of goods between a storage and retrieval system and a picking station, and from a picking station to a pick-up point may for instance be performed by conveyor belts or autonomous vehicles.

FIG. 1 shows an example of a compact automated storage and retrieval system 10 according to prior art. The storage and retrieval system comprises a framework structure 100 and container handling vehicles 150 handling storage containers 106 containing goods.

The framework structure 100 defines a storage grid 104 comprising storage columns 105 arranged in rows, in which storage containers 106, are stacked one on top of another to form stacks 107.

The automated storage and retrieval system 10 comprises a rail system 108 for guiding container handling vehicles 150. The rail system 108 is arranged in a grid pattern across the top of the storage grid 104. Container handling vehicles 150 are running on the rail system 108 and operated to lower and raise storage containers 106 into and from the storage columns 105 as well as transporting the storage containers 106 on the rail system 108. The horizontal extent of one of the grid cells 122 constituting the grid pattern is marked by thick lines in the figure.

The rail system 108 comprises a first set of parallel rails 110 arranged to guide movement of the container handling vehicles 150 in a first direction X across the top of the frame structure 100, and a second set of parallel rails 111 arranged perpendicular to the first set of rails 110 to guide movement of the container handling vehicles 150 in a second direction Y which is perpendicular to the first direction X. In this way, the rail system 108 defines grid columns above which the container handling vehicles 150 can move laterally above the storage columns 105, i.e. in a plane which is parallel to the horizontal X-Y plane.

The figure further shows two delivery columns 119 and 120 used for retrieving or storing storage containers 106. The first delivery column 119 may for example comprise a dedicated drop-off port where the container handling vehicles 150 can drop off storage containers 106 to be transported through the delivery column 119 and further to a picking station 200 or a transfer station (shown in FIG. 2), and the second delivery column 120 may comprise a dedicated pick-up port where the container handling vehicles 150 can pick up storage containers 106 that have been transported through the delivery column 120 from the access or transfer station.

Each container handling vehicle 150 comprises a vehicle body and a wheel arrangement of eight wheels 201 where a first set of four wheels enable the lateral movement of the container handling vehicles 150 in the X direction and a second set of the remaining four wheels enable the lateral movement in the Y direction. One or both sets of wheels in the wheel arrangement can be lifted and lowered, so that the first set of wheels and/or the second set of wheels can be engaged with respective set of rails 110, 111, where this is defined by a controller controlling driving means in the container handling vehicle 150 for controlled directional movements of the container handling vehicle 150.

Each container handling vehicle 150 further comprises a lifting device (not shown) for vertical transportation of storage containers 106, e.g. raising a storage container 106 from, and lowering a storage container 106 into, a storage column 105. The lifting device comprises one or more gripping/engaging devices (not shown) adapted for engaging a storage container 106. The gripping/engaging devices can be lowered from the vehicle 150 by the lifting device for adjusting the position of the gripping/engaging devices in a third direction Z which is orthogonal to the first and second directions X, Y.

Each container handling vehicle 150 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1. Alternatively, the container handling vehicles 150 may have a cantilever construction, as is described in NO317366.

Each storage container 106 can hold a plurality of product items/goods, typically of same type. The described construction of the automated storage and retrieval system provides compact and space-saving storage of goods and is well suited for being installed in locations having little floor space for storage.

FIG. 2 shows an example of a prior art delivery rail system 190 extending from a location inside a storage grid 104 to a location outside the storage grid 104, in this case a picking station 200. The example further shows autonomous vehicles 210 transporting storage containers to the picking station 200.

At the picking station goods are picked from different storage containers 106 according to orders. Picked goods may be placed in the same storage container 106 for further transport to a packing station where ordered goods are packed and prepared for shipment. Picked goods may also be packed and prepared for shipment at the picking station 200. In addition, a conveyor 195 may be arranged at or near the same place as the delivery rail system 190. The conveyor 195 can be used for transferring goods prepared for shipping to a pick-up point.

For monitoring and controlling the automated storage and retrieval system 10, the system comprises a control system (not shown) which typically is computerized and comprises a database keeping track of the location of the storage containers 106 and which storage containers 106 are to be handled at any time according to orders. The control system will monitor and control the location of respective storage containers 106 within the storage grid 104; the content of each storage container 106; and positions and movements of the container handling vehicles 150 so that a requested storage container 106 can be retrieved and transferred to a specific location at a desired time.

When a storage container 106 stored in the grid 104 disclosed in FIG. 1 is to be accessed, the control system instructs one of the container handling vehicles 150 to retrieve the storage container 106 from its current position in the grid 104 and to transport it to or through the first delivery column 119. This operation involves moving the container handling vehicle 150 to a grid location above the storage column 105 in which a target storage container 106 is positioned, retrieving the storage container 106 from the storage column 105 using the container handling vehicle's lifting device (not shown), and transporting the storage container 106 to the first delivery column 119. If the target storage container 106 is located deep within a stack 107, i.e. with one or a plurality of other storage containers positioned above the target storage container 106, the operation will include temporarily moving the above-positioned storage containers 106 prior to lifting the target storage container 106 from the storage column 105. This step, which is sometimes referred to as "digging" within the art, may be performed with the same container handling vehicle 150 that is subsequently used for transporting the target storage container 106 to the delivery column, or with one or a plurality of other cooperating container handling vehicles 150. Alternatively, or in addition, the automated storage and retrieval system 10 may have container handling vehicles 150 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers may alternatively be relocated to other storage columns 105.

It will take time to prepare goods from storage containers 106 according to specifications in orders. Conventionally, ordered goods are picked and prepared for shipment once orders are received. If not collected at a pick-up point right away, boxes with goods prepared for shipping will occupy floor space until they are collected.

One problem with this is that floor space required to be occupied by boxes may not be available at facilities with limited floor space. Another problem is that some types of goods, e.g. food, should be stored at a specific temperature and thus cannot stay at a pick-up point having another temperature for long periods.

Since goods prepared for collection at a pick-up point will occupy floor space until they are collected, it is desirable to keep the goods in the automated storage and retrieval system until the goods are ready to be picked up for transportation to another location, e.g. to the addressee of the ordered goods. It may however be difficult to estimate when ordered goods will be collected. This problem exists for both smaller and larger automated storage and retrieval systems. Smaller systems are typically installed in locations having little storage space at its pick-up point, while larger systems have high activity with a lot of orders prepared for shipping.

Accumulation of goods may occur if not picked up when expected, e.g. a truck does not show up in time.

The present invention addresses this problem and provides a solution where ordered goods are prepared and delivered to a pick-up point when a pick-up entity, e.g. a vehicle is ready to pick it up. This is achieved by ranking orders of goods and preparing and delivering orders to a pick-up point according to ranking and estimated pick-up times. This is performed in real-time and is continuously updated.

SHORT DESCRIPTION OF THE INVENTION

The present invention is defined in the main claims with additional featured defined in dependent claims. More specifically, the invention is defined by a method for preparing and delivering orders of goods from an automated storage and retrieval system to a pick-up point when ready to be picked up at the pick-up point. The method comprises the following steps:

receiving a plurality of orders in an order list;
ranking the plurality of orders in the order list;
allocating each order to one of a plurality of pick-up entities;
estimating for each order a preparation time for preparing and delivering the order to a pick-up point for pick-up by the allocated pick-up entity;
estimating for each order a pick-up time at which the allocated pick-up entity will be ready to pick-up the order based on information about the allocated pick-up entity;
comparing for each order the estimated preparation time and the estimated pick-up time;
updating the ranking of the orders in the order list so that each order will be delivered for pick-up at the pick-up point at a time within a predetermined time interval overlapping the estimated pick-up time; and
preparing and delivering the orders of goods at the pick-up point according to their ranking in the order list.

According to one embodiment, the estimated pick-up time for a pick-up entity is revised based on new information about the pick-up entity. The ranking of the orders in the order list is then updated based on the revised estimated pick-up time.

Estimation of the pick-up time for a pick-up entity may be based upon information about a location of the pick-up entity, an expected travel time to the pick-up location with a pick-up point, expected delays or cancellations, and/or historical data.

The estimating, updating and ranking are all performed in real-time as the orders of goods are being prepared.

Information about a location of the pick-up entity may be generated by one or more of the following methods: receiving location data from the pick-up entity, e.g. from a tracking device or GPS in the pick-up entity; detecting a RFID tag in or on the pick-up entity when passing an RFID-reader; visually detecting the pick-up entity at a location; determining which cell a mobile phone associated with an operative of the pick-up entity is connected to; manually by receiving location information from a person by voice or data input.

Ranking of a plurality of orders may comprise determining the urgency of an order based on one or more of the following criteria: the time the order was received, type of goods in the order, the location in the storage and retrieval system of the goods in the order, and/or the priority of the order which is described in the detailed description below.

According to an embodiment of the method, the rank of the order in the order list is changed based on updated information of the pick-up entity and/or when the order is updated with a new priority.

According to one embodiment, new orders are continuously added to the order list.

According to one embodiment, the preparation time for preparing and delivering orders to a pick-up point for pick-up by an allocated pick-up entity is communicated to the pick-up entity. This can be helpful if a pick-up entity is ready to pick up orders, but the orders will not be prepared and ready for pick-up after for instance 30 minutes. The pick-up entity can then use this time efficiently by first completing other tasks.

According to one embodiment, information related to orders including preparation time, linked entity, pick-up time and ranking of orders is continuously registered and machine learning is used for optimizing preparing of orders for a specific storage and retrieval installation. This is useful, since different installations typically store different types of goods, have different configurations and pick-up points and they may be operated differently. By learning how a specific automated storage and retrieval system is operated and the traffic flow of orders stored in the system, preparation of orders from the specific installation can be optimized and improved over time.

The pick-up entity used for transporting ordered goods from the pick-up point to a destination, e.g. addressee, may be among one or more of the following: vehicle, boat, plane, train, drone, bicycle or person.

The invention is also defined by a computer program product that when executed by a processor in a controller of an automated storage and retrieval system performs the method described above for preparing orders of goods. The computer program can be implemented as an additional software module of a control system controlling and running all operations of the automated storage and retrieval system.

The invention is further defined a control system for controlling operations of the container handling vehicles handling storage containers holding goods stored in an automated storage and retrieval system. The control system is adapted for controlling preparing and delivering of orders of goods to a pickup-point when ready to be picked up. The control system comprises input means, memory means, and processing means arranged for receiving information of a plurality of orders and pick-up entities and storing them in the memory means;

the processing means is arranged for running a computer program that when executed performs the following steps:
allocating each order to one of the pick-up entities;
ranking the plurality of orders in the order list;
estimating for each order a preparation time for preparing and delivering the order to a pick-up point for pick-up by the allocated pick-up entity;
estimating for each order a pick-up time at which the allocated pick-up entity will be ready to pick up the order based on information about the allocated pick-up entity;
comparing for each order the estimated preparation time and the estimated pick-up time;
updating the ranking of the orders in the order list so that each order will be delivered at the pick-up point at a time within a predetermined time interval overlapping the estimated pick-up time; and
preparing the orders according to their ranking in the order list; and where the controller is adapted to control the automated storage and retrieval system according to the ranking of orders in the order list.

DETAILED DESCRIPTION OF THE INVENTION

Certain embodiments of the invention will now be described by way of example only and with reference to the figures where:

FIG. 4A is a table where orders are sequentially organized according to time received;

FIG. 4B is a table where the orders are sorted by pick-up entity and priority;

FIG. 4C is a table where the orders are sorted according to estimated pick-up time;

FIG. 4D is a table where the orders are sorted according to estimated pick-up time and priority of each order.

Figure 1:
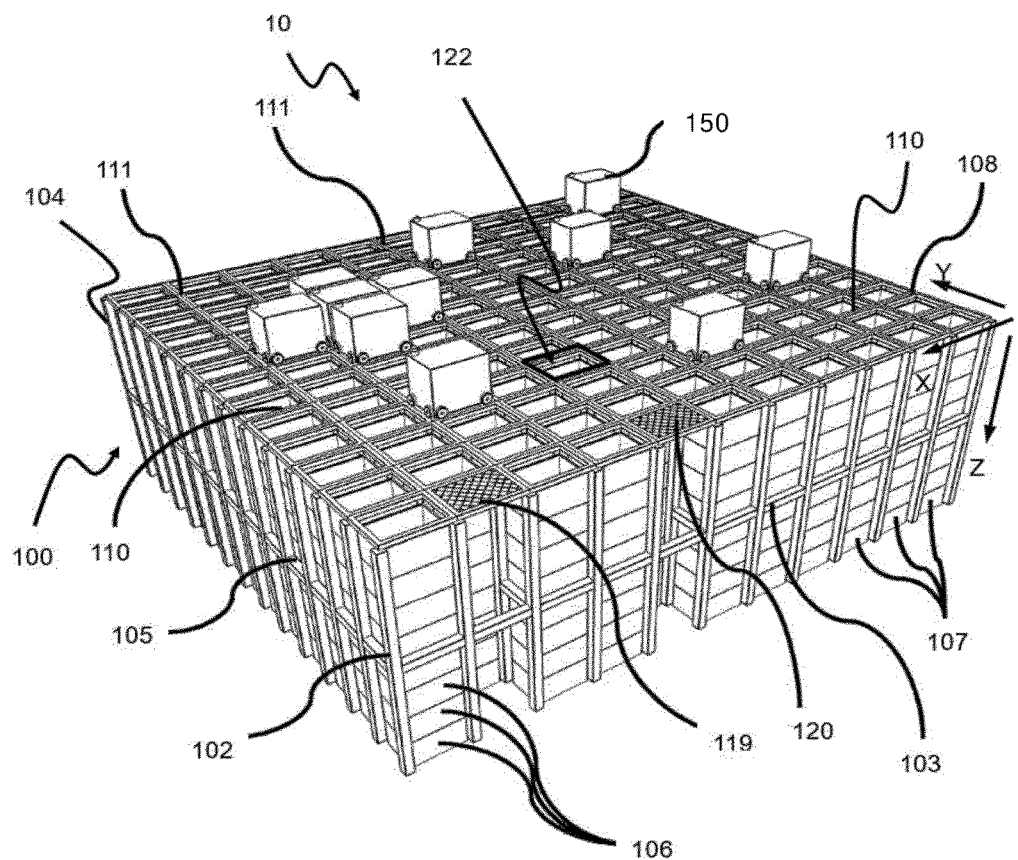
FIG. 1 shows an example of a typical prior art automated storage and retrieval system where container handling vehicles are handling storage containers.

FIG. 1 shows an example of a typical prior art automated storage and retrieval system 10 that can be made very compact and adapted to available floor space. The features of the system are described in the background above. Such automated storage and retrieval systems 10 are therefore well suited for being installed in connection with for instance shopping malls, centres or shops. Such places often have limited floor space reserved for storing. Available floor space is usually reserved for display of goods were customers can have a closer look. This is a typical scenario for shops offering goods via a web page and in addition have physical locations, e.g. shops, where goods for sale can be viewed and where ordered goods can be picked up.

To avoid that orders prepared for shipping pile up and occupy valuable floor space it is desirable to keep ordered goods stored in the automated storage and retrieval system 10 until it is ready to be picked up.

Different kinds of goods are normally stored in storage containers 106 stored in different grid cells 122 and at different levels below other storage containers 106. Picking of goods may be performed by specialised picking vehicles above or below a storage grid 104 or at a dedicated picking station connected to the storage grid 104. Independently of how picking of goods is performed, it will take some time to assemble an order depending of number and type of goods ordered and the size of the automated storage and retrieval system 10.

Figure 2:
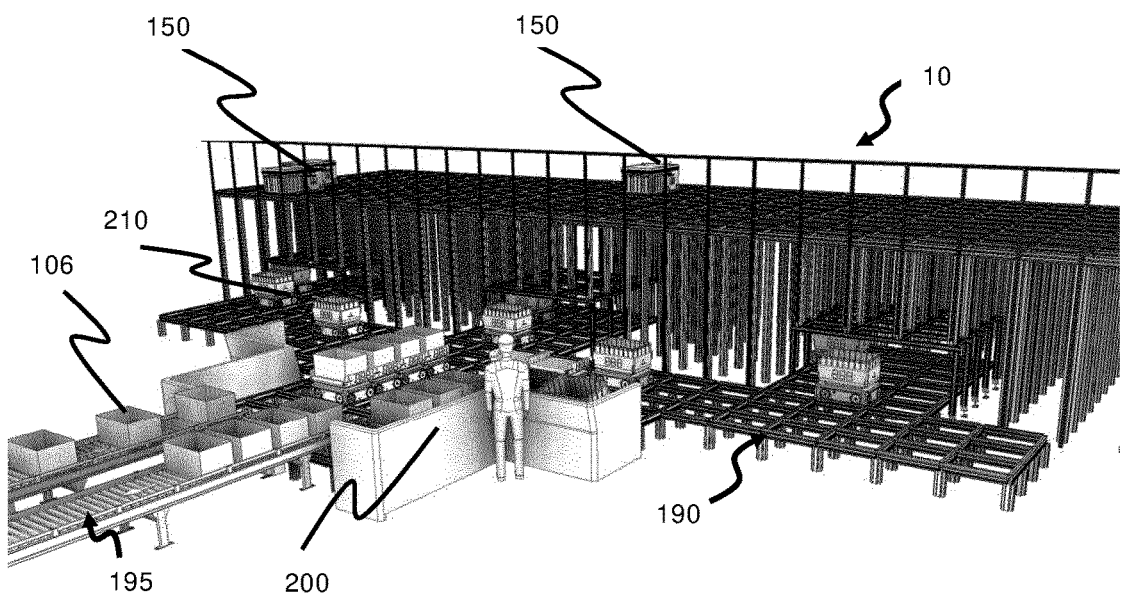
FIG. 2 shows another example of a prior art storage and retrieval system connected to a picking station.

FIG. 2 shows another example of a prior art storage and retrieval system. The figure illustrates a picking station connected to an automated storage and retrieval system 10. This is also described in more detail in the background section above.

When goods are picked and packed in a box prepared for shipping to an addressee, they are normally transferred to a pick-up point at the facility where the automated storage and retrieval system is installed. At the pick-up point goods will be transferred to pick-up entity shipping it to a destination. The goods may for instance be loaded onto a vehicle shipping ordered goods to the addressee of the order.

Figure 3:
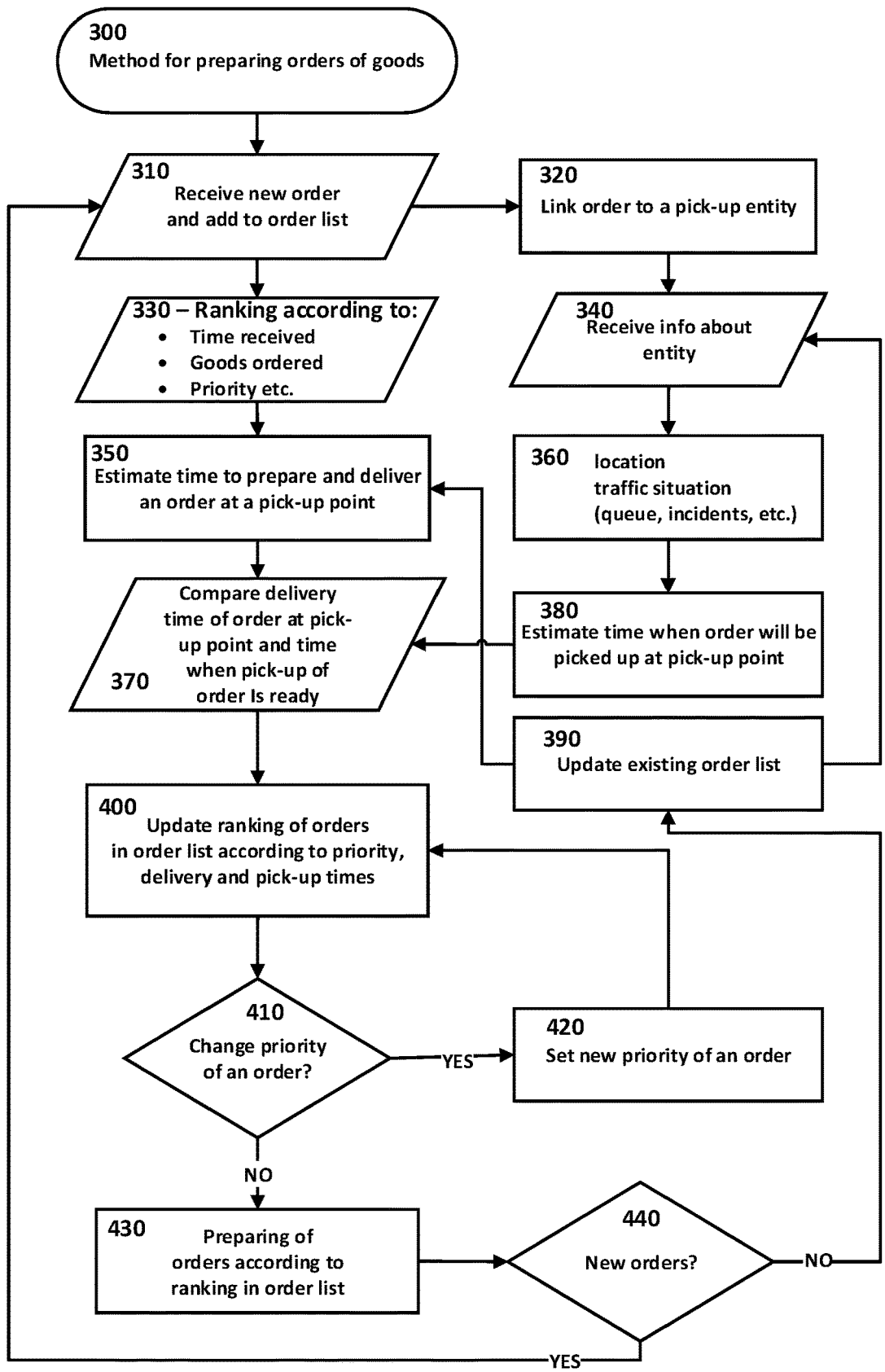
FIG. 3 is a flow chart illustrating the different steps of the method for preparing orders of goods from an automated storage and retrieval system.

The method for preparing orders of goods from an automated storage and retrieval system will be described with reference to FIG. 3 which is a flow chart illustrating the different steps 300 performed. The method is performed by a control system having total overview of the stock of goods stored in different storage containers 106 in the automated storage and retrieval system 10 and which is controlling all operations of the container handling vehicles 150 operating storage containers 106.

According to the method, orders are received and added to an order list 310 comprising a plurality of orders. Each order comprises information about time received and goods ordered 330. It may further comprise information about priority, e.g. "low", "normal" or "high" priority. Initially the orders are ranked according to time received. Based on the order, the elapsed time for preparing and delivering it to a pick-up point is estimated 350.

Each order is linked 320 to a pick-up entity assigned to pick up the order and deliver it to an addressee. The pick-up entity may for instance be a person or a vehicle that will come for ordered goods packed in boxes placed at a pick-up point. Information about the entity is then received 340. This information will form the basis for determining when the pick-up entity of the order will arrive at the pick-up point. The information may comprise current location and traffic situation 360, e.g. if there is normal traffic or a queue. Based on this, arrival time of a pick-up entity of an order will be estimated 380.

The estimated arrival time may also be directly transmitted from the assigned pick-up entity or transmitted through an operating function of an app or software module. If so, the arrival time is transmitted to the control system having the total overview and which is controlling all operations of the container handling vehicles 150 and storage containers 106.

The estimated arrival time of a pick-up entity at the pick-up point is then compared 370 with the estimated time for preparing an order linked to the pick-up entity.

Based in this, ranking of orders is updated 400 according to the time for preparing and delivering the ordered goods at the pick-up point, estimated time when goods can be picked up at the pick-up point and priority of the order.

If the point in time an order can be picked up at a pick-up point is earlier than the point in time the ordered goods are prepared, i.e. picked, packed and delivered at the pick-up point, the order will be executed and prepared right away. This is the case when the priority of the order is set to "normal".

Setting and changing priorities of orders can be useful according to different types of goods ordered. For instance, foods to be kept cold should be picked up and transferred from a pick-up point as soon as the food is prepared and arrive at the pick-up point. If, for instance, three different orders can be picked up at the same time by the same or different vehicle(s), they will be ranked in the order list in a sequence according to time stamps defining when each order was received. If, however the three different orders are registered with different priorities, e.g. in one scenario a first order with the latest time stamp comprises food and is set to "high", a second order having a first time stamp comprises shoes is set to "low" and a third order comprises gadgets set to "normal", the ranking of the order list will then be updated accordingly, i.e. first order is picked first (so that the foods can be stored in a controlled temperature environment in the pick-up entity), then the third order and then the second order. Priorities may change according to type of goods and updated information of expected pick-up time.

The ranking of orders in an order list can be changed 410 if it is decided that a new priority is to be set for an order. An order currently ranked as #11 in an order list may for instance be changed and ranked as #1 in an updated order list. The reason for doing this may for instance be that a new entity is assigned to pick up the order and this entity, e.g. vehicle, is already located at the pick-up point ready to pick up the order.

Orders for VIP customers or rush orders may also be marked as "high priority".

High priority orders, such as foods to be kept cold, may in another embodiment be treated such that these orders are prepared last of several different orders linked to a pick-up vehicle. In this way foods can be kept at a controlled temperature in the storage and retrieval system for as long as possible until a linked pick-up vehicle has arrived at the pick-up point. This method can be used if the temperature-controlled environments the storage system provides are likely to be better than that of the pick-up entity, and therefore the longer the goods stay stored in the system, potentially the better. If they are prepared last, there is also less danger of them waiting around in the pick-up area due to a local delay from the pick-up entity and they are also first to be taken off the pick-up entity at the delivery destination.

The preparing of the orders is performed according to ranking of the orders in the order list 430. Each order executed, i.e. prepared and picked up from the pick-up point, is removed from the order list. It is further checked if new orders are registered 440. If this is the case, new orders are added to the order list 310 and the method is repeated from step 310. If no orders are added, the existing order list is updated 390 by re-entering steps 340 and 350 described above, i.e. updating ranking of orders in the order list by receiving updated information of pick-up entities and compare this to elapsed time for preparing the orders.

The method described above is repeated until all orders in an order list have been executed.

FIG. 4A to 4D illustrate an example where ten orders are ranked and prepared according to the inventive method.

FIG. 4A is a table listing orders sequential organized according to time received. Each order is time stamped and the time to prepare the order is estimated, i.e. to pick and pack ordered items and transport them to a pick-up point. In addition, each order is linked to a pick-up entity. Which entity an order is linked to depends on where it is to be shipped. In the figure, orders #01, #02 and #07 are linked to the same pick-up entity A, e.g. a vehicle headed for the same addressee for the orders. Orders #05, #09, #04 and #10 are linked to pick-up entity B while orders #03, #08 and #06 are linked to pick-up entity C.

FIG. 4B is a table with a rearranged list where the orders are grouped and sorted by linked pick-up entity and priority.

FIG. 4C is a table where orders are sorted according to estimated pick-up time. The table shows a preparing sequence for the different orders according to estimated pick-up times of the three different pick-up entities, A, B and C, at the pick-up point. Estimated pick-up times are continuously updated and may for instance change depending on the traffic situation. The pick-up time is the main factor defining the preparing sequence of orders to avoid accumulation of prepared goods at the pick-up point. It is expected that a pick-up time will be more accurately estimated the closer a pick-up entity is to the pick-up point. In the example shown in the table, pick-up entity C will be the first to arrive at the pick-up point, then pick-up entity B and last pick-up entity A.

In the example illustrated in FIG. 4C, it is decided to have orders prepared and delivered at the pick-up point 5 minutes in advance of the estimated pick-up time. The table shows the preparing sequence for orders linked to the pick-up entities. The column "Start time for preparing" shows the start time when specific orders should be prepared for arriving at the pick-up point 5 minutes prior to the estimated pick-up time of the pick-up entity. According to the sequence listed in the table, order #06 is first prepared, then order #03 and then #08 etc.

Preparing of orders may start such that each order arrives at and is delivered at the pick-up point with 10 seconds intervals to avoid conflicts at the pick-up point. This is illustrated in table 4D where priorities of orders are also considered.

For orders containing foods to be kept cold it may be desirable to transfer it to a pick-up entity as soon as it is prepared and arrives at the pick-up point. The pick-up entity linked to such orders may for instance be a vehicle having cooling means. Such orders may be flagged as "High priority". As mentioned above, orders set with "high priority" can be treated differently depending on for instance cooling facilities of the linked pick-up vehicle.

FIG. 4D is a table where orders are sorted according to estimated pick-up times and priorities. In this example, it is determined that the linked pick-up entity should have arrived at the pick-up point 5 minutes prior to arrival of linked prepared goods. In this way orders comprising foods flagged as "high priority" can be immediately transferred to, for instance, a vehicle with cooling means.

An order may be part-assembled. It may for example comprise different types of goods such as clothes and foods, and where the clothes of the "order" may be collected and temporarily stored somewhere other than the pick-up area (a buffer area where partially assembled orders can be stored), and then when the system knows that the pick-up entity has arrived, the food part or high priority part of the order is added to it at the last minute before loading onto the pick-up entity. In this way, the assembly of the order might be started when the pick-up entity is known to be, for instance, 15 minutes away, then the time critical goods are added when the pick-up entity has arrived taking into account delays experienced locally by the pick-up entity which occurs during the assembly of the complete order and which causes a change in the ranking of that last part of the order.

According to the method described herein, the preparing sequence is continuously updated according to estimated pick-up times, preparing times and of orders and priorities. In an automated storage and retrieval system, elapsed time for preparing an order for shipment can be estimated quite accurately. By continuously estimating pick-up times of linked pick-up entities, prepared orders will not accumulate at the pick-up point when for instance a linked pick-up vehicle does not show up.

In this way goods stored in the automated storage and retrieval system will stay stored until they are ready to be picked up and shipped to a destination.

By preparing and delivering orders of goods to a pick-up point according to a ranked list of the orders defined by the present invention, available floor space is used in a most efficient way as well as the use of personnel and robots handling and picking orders. The ranking list which is continuously updated will function as a filter and can be used for handling peak periods of the day thereby avoiding accumulation of orders and where for instance only orders with "high" priority is prepared in peak periods. This means that the work load will be more evenly distributed throughout the day.

During periods with little activity, orders ahead in time can be prepared and returned for storage in the storage and retrieval system. In this way the storage and retrieval system will function as a buffer for orders already picked and collected in same bin. These orders will then, when they are ready to be picked up, be prepared and delivered to a pick-up point faster.

The invention claimed is:

1. A method of preparing and delivering orders of goods stored in storage containers of an automated storage and retrieval system and delivering prepared goods to a pick-up point when ready to be picked up at the pick-up point by pick-up entities, wherein the automated storage and retrieval system is controlled by a control system comprising an input, memory, and processor, wherein the control system is arranged for receiving information of a plurality of orders and pick-up entities, the processor comprises a computer program performing the method comprising:
   receiving a plurality of orders in an order list;
   allocating each order to one of the pick-up entities;
   setting a priority for each of the orders based on whether the order contains products to be stored in a temperature controlled environment;
   ranking the plurality of orders in the order list according to the priority of each order;
   estimating for each order a preparation time for preparing and delivering the order to a pick-up point for pick-up by the allocated pick-up entity;
   estimating for each order a pick-up time at which the allocated pick-up entity will be ready to pick up the order based on information about the allocated pick-up entity;
   comparing for each order the estimated preparation time and the estimated pick-up time;
   updating the ranking of the orders in the order list so that each order will be delivered at the pick-up point at a time within a predetermined time interval overlapping the estimated pick-up time of the allocated pick-up entity; and
   controlling the automated storage and retrieval system by the control system for preparing and delivering the orders of goods at the pick-up point according to the updated ranking of orders in the order list.

2. The method as claimed in claim 1, further comprising:
   revising the estimated pick-up time for a pick-up entity based on new information about the pick-up entity; and
   updating the ranking of the orders in the order list based on the revised estimated pick-up time.

3. The method as claimed in claim 1, wherein estimating the pick-up time for a pick-up entity is based upon information about a location of the pick-up entity, an expected travel time to the pick-up point, expected delays, and/or historical data.

4. The method as claimed in claim 3, wherein information about a location of the pick-up entity is generated by one or more of the following methods:
   receiving location data from the pick-up entity;
   receiving location data by detecting an RFID tag in or on the pick-up entity when passing an RFID-reader;
   visually detecting the pick-up entity at a location; and
   determining which cell a mobile phone associated with an operative of the pick-up entity is connected to.

5. The method as claimed in claim 1, wherein ranking the plurality of orders comprises determining an urgency of an order based on one or more of the following criteria:
   the time the order was received,
   type of goods in the order,
   a location in the automated storage and retrieval system of the goods in the order, and/or
   a priority of the order.

6. The method as claimed in claim 1, further comprising changing a priority of an order.

7. The method as claimed in claim 1, further comprising adding a new order to the order list.

8. The method as claimed in claim 1, further comprising using a pick-up entity among one or more of the following: vehicle, boat, plane, train, drone, bicycle or person.

9. The method as claimed in claim 1, wherein the preparation time for preparing and delivering orders to a pick-up point for pick-up by the allocated pick-up entity is communicated to the pick-up entity.

10. The method as claimed in claim 1, by continuously registering information related to orders including preparation time, linked entity, pick-up time and ranking of orders and using machine learning for optimizing preparing of orders for a specific storage and retrieval installation.

11. The method as claimed in claim 1, wherein the priority is set based on whether the order contains products to be stored in a cooled environment, and cooling facilities of the pick-up entity.

12. A control system connected to an automated storage and retrieval system for controlling preparing and delivering of orders of goods from the automated storage and retrieval system and delivering prepared goods to a pick-up point when ready to be picked up at the pick-up point by pick-up entities, the control system comprises an input, memory, and processor, the control system is arranged for receiving information of a plurality of orders and a plurality of pick-up entities and storing the plurality of orders and a plurality of pick-up entities in the memory;
   wherein the processor is arranged for running a computer program that, when executed, performs:
   receiving a plurality of orders in an order list;
   allocating each order to one of the plurality of pick-up entities;
   setting a priority for each of the orders based on whether the order contains products to be stored in a temperature controlled environment;
   ranking the plurality of orders in the order list according to the priority of each order;
   estimating, for each order, a preparation time for preparing and delivering the order to a pick-up point for pick-up by the allocated pick-up entity;
   estimating, for each order, a pick-up time at which the allocated pick-up entity will be ready to pick up the order based on information about the allocated pick-up entity;
   comparing, for each order, the estimated preparation time and the estimated pick-up time;
   updating the ranking of the orders in the order list so that each order will be delivered at the pick-up point at a time within a predetermined time interval overlapping the estimated pick-up time; and
   wherein the controller is adapted to control the automated storage and retrieval system for preparing according to the updated ranking of orders in the order list.

13. The control system according to claim 12, wherein the priority is set based on whether the order contains products to be stored in a cooled environment, and cooling facilities of the pick-up entity.

* * * * *